United States Patent [19]

Favreau

[11] Patent Number: 4,615,057
[45] Date of Patent: Oct. 7, 1986

[54] PROCESS FOR MOULDING HOLLOW ARTICLES OF SYNTHETIC PLASTIC MATERIAL HAVING AN EXTERNAL FINISHING LAYER APPLIED TO DURING THE MOULDING

[75] Inventor: Jean Favreau, Paris, France
[73] Assignee: Groupe Axinove, France
[21] Appl. No.: 578,196
[22] Filed: Feb. 8, 1984
[30] Foreign Application Priority Data Feb. 10, 1983 [FR] France ............................. 83 02151

[51] Int. Cl.⁴ ..................... E03D 11/00; B29C 39/12
[52] U.S. Cl. .......................................... 4/420; 4/443; 4/538; 4/596; 264/245; 264/255; 264/309
[58] Field of Search ............ 264/255, 257, 250, 328.6, 264/337, 338, 241, 245, 309; 4/420, 443, 538, 596

[56] References Cited
FOREIGN PATENT DOCUMENTS 1420867 1/1976 United Kingdom .

Primary Examiner—Donald Czaja
Assistant Examiner—Mary Lynn Fertig
Attorney, Agent, or Firm—Ostrolenk, Faber, Gerb & Soffen

[57] ABSTRACT

A process is described of coating the interior wall of a mould heated at a temperature of 130° to 180° C. with a dry powder of an aminoplast or phenoplast resin, in particular melamine-formaldehyde, having a grain size distribution of 10 to 100$\mu$, whose particles gel in contact with the walls without running, then introducing into the mould a moulding composition comprising a thermosetting resin, mineral fillers and a catalyst, hardening and polymerizing by heat and pressure the contents of the mould and releasing the article whose coating is solidly anchored in the moulding composition.

Sanitary ware articles of polyester-based substrate and melamine-formaldehyde-based coating, and refrigerator boxes consisting of polyurethane foam substrate and melamine-formaldehyde coating can be produced.

18 Claims, No Drawings

PROCESS FOR MOULDING HOLLOW ARTICLES OF SYNTHETIC PLASTIC MATERIAL HAVING AN EXTERNAL FINISHING LAYER APPLIED TO DURING THE MOULDING

This invention relates to a method for moulding hollow objects of synthetic plastic material by coating the wall of a heated mould with thermosetting plastic material, then introducing into the mould a moulding composition comprising a thermosetting resin, mineral fillers and a catalyst, hardening and polymerizing the contents of the mould by the application of heat and pressure and releasing the object whose coating is solidly anchored in the moulding composition. The object of such methods is to apply, during moulding, an external finishing or protective layer to the moulding composition constituting the substrate, so that the demoulded product has a strongly adhering film on it. By proceeding in this manner, a surface finishing treatment is no longer necessary and the production of such hollow objects is limited to the moulding operation.

Sheet material is used especially as a substrate, notably moulding polyester sheets.

According to the technology known to this day, the coating applied to the heated wall consists of a polyester powder, either partially polymerized or in a mixture with a cross-linking monomer, with addition of a catalyst.

The utilization of polyester powders seems particularly attractive when the substrate consists of moulding polyester sheets for compatibility reasons. However, a polyester coating does not always provide the properties required in the fabrication of objects having a decorative appearance for when the polyester coating is of light colour, yellow stains appear which are detrimental to the external appearance of the object. In addition, the degree of transparency of the polyester coating is not always sufficient to enable varied decorative effects to be obtained by applying layers of different colours to the back of the coating layer on a substrate on which decorative subjects have been printed. Thirdly, the finish of the coating surface is limited to a matte or silky finish, as it is impossible to obtain a high degree of gloss.

The replacement of the polyester by other plastic coating materials not giving rise to these drawbacks was not possible because of the incompatibility between the resins, which prevented good adhesion between the layers constituted by different resins being obtained.

According to the results of the work which led to this invention, it was unexpectedly found that other synthetic plastic materials can be used advantageously in the form of a powder to constitute the coating of a moulded object, without any loss of its adhesion properties.

The object of this invention is to provide a method of the type mentioned above characterized in that a dry powder of a plastic material chosen from the group comprising aminoplasts and phenoplasts, in particular melamine-formaldehyde, urea-formaldehyde and phenol-formaldehyde, whose particles gel in contact with the hot wall of the mould without running, is sprayed onto the internal wall of the mould heated to a temperature of 130° to 180° C. to form a coating. The resins used are polycondensation resins which, contrary to the polyesters which polymerize by the radical route, cross-link by the ionic route with elimination of water. Because of this different cross-linking mechanism, prejudice prevented the utilization of these resins, because it was feared that the sudden evaporation of water during hardening would lead to an undesirable surface finishes.

Against all expectation, it was found that the application of the above mentioned plastic materials enabled objects to be obtained whose coating formed inside the mould, and in addition adhered very well to the substrate, resisted abrasion and scratching, chemical products, cigarette burns and hot water, and also showed good heat resistance.

The plastic material recommended especially is melamine-formaldehyde plasticised with polyamide monomers such as caprolactam and lauryllactam, saccharose or sorbitol, whose composition comprises an accelerator, for example, diammonium imido sulfonate, with a grain size distribution range of 10 to 100$\mu$, preferably between 10 and 60$\mu$ and which can contain mineral fillers, such as calcium carbonate, microscopic silica particles and glass beads, as well as pigments.

According to one advantageous embodiment, the thickness of the coating layer applied is equal to or less than 120$\mu$. It has been found that for comparable results, the quantity of coating material required, when the resins are applied according to the invention, is much less than that necessary when a polyester coating is applied, which enables substantial savings of the material used to be made. According to another feature of the invention, the accelerator is used in a quantity such that the hardening time is at least one minute. When it does not contain any fillers, the composition according to the invention is in the form of a crystalline while powder which, after gelling, gives a transparent coating layer. The transparent nature of this layer enables a large range of decorative effects to be obtained. After having covered the mould wall with this composition, either several layers of different colour can be applied or a substrate impregnated with decorative design placed above it. The substrate used for moulding can consist either of moulding plastic material films, for example, of polyester or epoxy resin, or of a loose thermosetting plastic material, such as polyester, epoxy or polyurethane or polyester foams, or else resin impregnated glass fibre mat.

The plastic material must be free of any material that is volatile or likely to evaporate when heated. Its softening point must be between 130° and 170° C., preferably about 150° C. The plasticizers can include, in addition to caprolactam, lauryllactam or other polyamide monomers, as well as carbohydrates, such as glucose or saccharose, or polyalcohols such as sorbitol, whose amounts can attain 12%.

Accelerators other than diammonium imido sulfonate can also be used, such as for example, amine salts, for example amine chlorides or compounds with a bivalent cation. The proportions used can attain 5% but a lower percentage should preferably be used, for example, 1 to 3% to slow down the hardening process.

According to one example of the embodiment of the method according to the invention, a bath was fabricated in the following manner. A mould of appropriate shape was maintained by means of a thermostated device at a temperature of about 150° C.

A mixture of grain size of about 50$\mu$ of the following composition was prepared:

| | |
|---|---|
| Melamine formaldehyde (softening point 150° C.) | 80.5% |
| Caprolactam | 8.0% |

| -continued | |
|---|---|
| Diammonium imido sulfonate | 1.5% |
| Cobalt Blue | 10% |

300 g of this powder were sprayed by means of an electrostatic spraygun onto the heated wall of the mould in three stages, each consisting in coating the mould with a layer about 30μ thick. After the last spraying, the coating thickness was about 100μ. Gelling in contact with the walls is more rapid, the thinner the layers, and the resin did not run during its application.

Polyester sheets were then placed in the mould which was then covered with a countermould and the assembly maintained under pressure for about three minutes.

After releasing the product from the mould, it was found that the coating had a fine glossy appearance of uniform colour and that the adhesion of the coating was good. A series of tests gave the following results:
TABER abrasion meter: 500 rounds-BACOLL hardness: 80
Cigarette burn (NFT-54-356): intact
Household cleaning products (NFT 54-257): intact
Xenotest (NFT 51-056): stable after 790 hours
10% citric acid: class AA
Surface heat resistance at 180° C. (NFT 54-354): intact
Scratch test (RENAULT method 1221 and 1010): 1000 g
Water at 100° C. for 100 hours (EP 825 E): intact
Heat stability at 165° C. (EP 825 E): intact.

As a comparative test, the same product was fabricated using in place of the melamine-formaldehyde resin a polyester resin consisting of an unsaturated polyvalent alcohol and an acid anhydride condensation product with addition of a prepolymer and a cross-linking monomer and a peroxide catalyst. The powder mixture was applied under the same conditions as before and a layer 100μ thick formed. On completion of fabrication, the product after release from the mould had a silky finish and colourless streaks on its oblique and vertical faces. In continuing the application tests for the same polyester resin mixture, it was found that only by tripling the quantity of powder was an article of acceptable colour obtained. Plate samples, obtained according to the method of the present invention and, obtained from the application of polyester resin were subjected to comparative tests. The results of these tests are given below:

|  | Melamine-formaldehyde | Polyester |
|---|---|---|
| TABER abrasion meter (portion of 100 rounds till 800 rounds | 0.6 mg | 0.75 mg |
| Gloss (ASTM D-523) | 48% | 37% |
| Scratch tests (CLEMEN method DEF-1053 ERICHSEN apparatus) | | |
| (a) not perceptible by hand feeling | 100 g | 125 g |
| (b) perceptible by hand feeling | 350 g | 400 g |
| Adhesive tape test (ASTM-D3359) | 0 | 0 |

These results demonstrate the equivalence of the two coatings as regards the adherence property and a superiority of the melamine-formaldehyde coating as regards gloss and abrasion and scratch resistance.

These advantages, added to the saving in material by the method according to the invention confer on the invention an innovative and definite technological progress character. Thus the solution is provided to the problem of obtaining products, usable notably in the sanitary ware field, having definite aesthetic characteristics allied with good abrasion and scratch resistance properties, due to the combination of a thermosetting resin based substrate, in particular a polyester, and a coating chosen from phenoplast and aminoplast resins, in particular melamine-formaldehyde.

The invention extends to sanitary products and articles, for example, baths, shower foot basins, tubs, tanks, bidets, bowls, sinks, wash basins and similar, obtained according to the method of the invention.

The products obtained by the process according to the invention may also find application in various other fields, such as moulded parts for furniture used in transportation vehicles and waiting-rooms, in all kind of shelters, like for bus stop shelters, other modular units, tanks and housings, car body parts and similar.

The moulded parts, in particular combining a polyurethane foam as substrate and a coating made from aminoplast or phenoplast, especially from melamine-formaldehyde, are suitable to be used as moulded parts for refrigerator boxes and freezers.

I claim:

1. A process for molding a hollow synthetic plastic article which comprises coating the interior wall of a mold with a dry resin powder by spraying onto said wall which has been heated to a temperature of 130 to 180 degrees C. a dry powder aminoplast or phenolplast polycondensation resin whose particles gel in contact with said wall without running, introducing into the molding composition consisting essentially of a polyester resin, mineral filler and catalyst, positioning a counter-mold on the mold thus filled, hardening and polymerizng the contents of the mold by the application of heat and pressure, and recovering the resulting moulded article from the mold, whereby the aminoplast or phenoplast coating is solidly anchored to the molding composition substrate.

2. The process of claim 1 wherein the aminoplast or phenoplast is a melamine-formaldehyde, urea-formaldehyde or phenol-formaldehyde resin.

3. The process of claim 2 wherein the aminoplast or phenoplast is a melamine-formaldehyde resin containing a polyamide monomer, carbohydrate or polyvalent alcohol plasticizer.

4. The process of claim 3 wherein said plasticizer is caprolactam and the melamine-formaldehyde dry powder has a softening point between 130 ° and 170° C.

5. The process of claim 3 wherein said molding composition contains as an accelerator, 1 to 3% diamonium imido sulfonate.

6. The process of claim 5 wherein the accelerator is used in a quantity such that the hardening time is less than one minute.

7. The process of claim 2 wherein said dry powder has a grain size distribution of 10 to 100 microns.

8. The process of claim 6 wherein the grain size distribution is 10 to 50 microns.

9. The process according to claim 2 in which more than one layer of said dry powder is sprayed on said walls.

10. The process according to claim 2 in which said mineral filler is calcium carbonate, silica particles or micro glass beads.

11. The process of claim 2 wherein said molding composition contains a colorant.

12. The process of claim 2 wherein after a crystalline, white powder of melamine-formaldehyde resin is coated on said walls, at least one layer of the different color is applied thereto.

13. The process of claim 2 wherein a crystalline, white powder of melamine-formaldehyde resin is sprayed on said walls and wherein said substrate has a decorative design on its surface.

14. The process of claim 1 wherein the dry resin powder is applied in an amount such that the resulting layer thereof has a thickness less than 120 microns.

15. The method of claim 9, wherein each layer of said dry powder has a thickness of less than 120 microns.

16. The process of claim 2 wherein the molding composition comprises resin impregnated glass fiber mat.

17. A sanitary wear article consisting essentially of a thermosetting resin based substrate having an aminoplast or phenoplast-based coating thereon prepared by the process of claim 1.

18. The sanitary wear article of claim 17 in which said aminoplast or phenoplast based coating is a melamine-formaldehyde based coating.

* * * * *